US007599544B2

(12) United States Patent
Moshe

(10) Patent No.: US 7,599,544 B2
(45) Date of Patent: Oct. 6, 2009

(54) AUTHENTICATING AND AUTHENTIC ARTICLE USING SPECTRAL IMAGING AND ANALYSIS

(75) Inventor: Danny S. Moshe, Kiryat Ono (IL)

(73) Assignee: Green Vision Systems Ltd, Tel Aviv (IL)

( * ) Notice: Subject to any disclaimer, the term of this patent is extended or adjusted under 35 U.S.C. 154(b) by 667 days.

(21) Appl. No.: 10/581,187

(22) PCT Filed: Dec. 1, 2004

(86) PCT No.: PCT/IL2004/001099

§ 371 (c)(1), (2), (4) Date: Jun. 1, 2006

(87) PCT Pub. No.: WO2005/055155

PCT Pub. Date: Jun. 16, 2005

(65) Prior Publication Data

US 2008/0192992 A1 Aug. 14, 2008

Related U.S. Application Data

(60) Provisional application No. 60/525,886, filed on Dec. 1, 2003.

(51) Int. Cl.
*G06K 9/00* (2006.01)

(52) U.S. Cl. ...................... 382/141; 382/100; 382/168; 359/534; 356/456; 427/8

(58) Field of Classification Search ................ 382/100, 382/103, 101, 141, 137, 168; 713/179, 168, 713/176; 427/8, 256; 359/534, 536, 900; 380/300, 51, 54, 59; 348/E5.006, E7.06, 348/E7.07; 375/E7.009, E7.024; 340/5.86, 340/5.1, 5.8; 106/31.64, 31.15, 31.32; 705/53, 705/57, 80; 708/250, 255; 523/161, 160; 252/301.35, 301.16; 356/451, 452, 456; 342/90, 22; 250/208.1; 257/E27.13

See application file for complete search history.

(56) References Cited

U.S. PATENT DOCUMENTS 5,666,417 A * 9/1997 Liang et al. .................. 283/92

(Continued)

FOREIGN PATENT DOCUMENTS

WO WO 81/03509 12/1981

(Continued)

*Primary Examiner*—Sheela C Chawan
(74) *Attorney, Agent, or Firm*—The Law Office of Michael E. Kondoudis

(57) ABSTRACT

Authenticating an authentic article having an authentication mark. Acquiring a set of spectral images of the authentication mark, for forming a set of single-authentication mark spectral fingerprint data (FIG. 1). Identifying at least one spectral shift in the set of single-authentication mark spectral fingerprint data, for forming an intra-authentication mark physicochemical region group including sub-sets of intra-authentication mark spectral fingerprint pattern data, such that data elements in each sub-set are shifted relative to corresponding data elements in remaining sub-sets in the same intra-authentication mark physicochemical region group (FIG. 2). Forming a set of intra-authentication mark physicochemical properties and characteristics data relating to the imaged authentication mark, by performing pattern recognition and classification analysis on the intra-authentication mark physicochemical region group (FIG. 3). Comparing and matching elements in the set of intra-authentication mark physicochemical properties and characteristics data to corresponding reference elements in reference set of data, thereby authenticating the authentic article.

23 Claims, 3 Drawing Sheets

(A) (B)

U.S. PATENT DOCUMENTS

| | | | | |
|---|---|---|---|---|
| 5,880,830 | A | 3/1999 | Schechter | |
| 6,091,843 | A | 7/2000 | Horesh et al. | |
| 6,364,994 | B1 | 4/2002 | Curiel | |
| 6,373,965 | B1 | 4/2002 | Liang | |
| 6,438,261 | B1 | 8/2002 | Moshe et al. | |
| 6,580,819 | B1 | 6/2003 | Rhoads | |
| 6,610,351 | B2 | 8/2003 | Shchegolikhin et al. | |
| 6,616,964 | B1 | 9/2003 | Hampp et al. | |
| 6,694,048 | B2 | 2/2004 | Moshe | |
| 6,697,510 | B2 | 2/2004 | Moshe | |
| 7,035,428 | B1 * | 4/2006 | Smith | 382/101 |
| 7,038,766 | B2 * | 5/2006 | Kerns et al. | 356/71 |
| 7,079,230 | B1 * | 7/2006 | McInerney et al. | 356/71 |
| 2003/0083826 | A1 | 5/2003 | Moshe | |
| 2003/0206649 | A1 | 11/2003 | Moshe | |

FOREIGN PATENT DOCUMENTS

| | | |
|---|---|---|
| WO | WO 01/84106 | 11/2001 |
| WO | WO 03/023692 | 3/2003 |
| WO | WO 03/085371 | 10/2003 |
| WO | WO 2005/036479 | 4/2005 |

* cited by examiner

AUTHENTICATING AND AUTHENTIC ARTICLE USING SPECTRAL IMAGING AND ANALYSIS

RELATED APPLICATIONS

This application is a National Phase Application of PCT Patent Application No. PCT/IL2004/001099 having International Filing Date of Dec. 1, 2004,which claims the benefit of U.S. Provisional Patent Application No. 60/525,886 filed on Dec. 1, 2003. The contents of the above Applications are all incorporated herein by reference.

FIELD AND BACKGROUND OF THE INVENTION

The present invention relates to spectroscopy and imaging based methods for authenticating authentic articles, and more particularly, to a method for authenticating an authentic article having an authentication mark, using spectral imaging and analysis.

The field of article authentication, including methods, devices, and systems, for authenticating authentic articles, and for protecting authenticity of authentic articles, is relatively well developed and sophisticated. Unfortunately, however, technologies and activities used for counterfeiting and/or illegally producing, distributing or circulating, using, and/or selling, authentic articles, have similarly become well developed and quite sophisticated, especially on a global international basis. There is a strong need for 'keeping at least one, hopefully, more than one, step ahead' of such developed and sophisticated counterfeit and/or illegal technologies and activities.

There exists a wide variety of different types of authentic articles. Printed articles are among the most well known and used types of authentic articles. For example, printed paper forms of monetary currency, bank notes, checks, and company or stock certificates; printed plastic (laminated) card forms of monetary currency, such as credit cards, debit cards, phone cards, personal travel and entertainment cards, and vehicular toll cards; and printed paper or plastic (laminated) card forms of identification and other types of legal documents, such as birth certificates, wedding certificates, divorce certificates, death certificates, ID cards, drivers licenses, passports, visas, and immigration documents.

Associated with the wide variety of different types of authentic articles, there exists a wide variety of different types of authentication marks. In general, an authentication mark can be considered as an 'internal' type of mark which is either inherent to, or part of, the material(s) making up the authentic article itself, or/and, as an 'external' type of mark which is incorporated onto or/and into the material(s) making up the authentic article, such that the authentication mark can be used for identifying or confirming the authenticity of the authentic article, by subjecting the authentic article to any number of a wide variety of different types of (humanly visible or otherwise sensed, or/and, machine-only visible or otherwise sensed) authentication techniques. In most cases, ultimately, an external type of authentication mark fully becomes an inherent part of the material(s) of the authentic article. A ribbon featuring specially designed texture(s), color(s), and pattern(s), which is commonly 'attached' (for example, by a staple, fine thread, tape, or glue) to a printed legal document type of authentic article, is an exemplary type of authentication mark which maintains its external nature with respect to the material(s) making up the authentic article.

In general, an authentication mark is composed of, or includes, any number of a variety of different types of materials or substances, singly or/and in combination. Such materials or substances are conveniently characterized and categorized as being chemical, physical, biochemical, molecular biological, or biological. Exemplary chemical types of materials or substances which are most commonly used for making authentication marks, especially for printed types of authentic articles, are inks and dyes. Exemplary physical types of materials or substances which are known to be used for making authentication marks are micro-sized non-metallic or metallic fibers, threads, or ribbons, or, micro-sized printed integrated electronic circuits or chips. Exemplary biochemical and molecular biological types of materials or substances which are known to be used for making authentication marks are protein or nucleic acid (DNA) molecules or molecular fragments. Exemplary biological types of materials or substances which are known to be used for making authentication marks are non-living or living microorganisms, such as bacteria or viruses.

Printed types of authentic articles typically include authentication marks, such as watermarks, which usually are made from materials or substances including a single type of an ink or dye, or including a variety of different types of inks or/and dyes. Accordingly, an authentication mark made from a material or substance including ink or/and dye, may be of a single color, or of a variety of several different colors. Ink or dye used for making or printing an authentication mark may include an aqueous or organic solvent base, and include one or more pigments in a completely dissolved form, in a partially dissolved or suspension form, or in a solid (micron sized fine powder) form. Herein, a pigment is generally understood as being any (organic or inorganic based) substance or matter used as coloring, where, in a dry particulate form, consists of particles or aggregates of particles. Typically, an authentication mark made from materials or substances including inks or/and dyes, is in a form of an alphabetic, numeric, alphanumeric, or/and picture, code, symbol, pattern, or design.

Authentication marks, as viewed by unaided human eyes, and touched by a human hand, may feature an essentially flat and smooth two-dimensional pattern or design, or, feature an elevated or contoured and rough, three-dimensional pattern or design characterized by a three-dimensional morphological or geometrical shape, form, or structure. Authentication marks may be any of a wide variety of different types of watermarks, where a watermark is generally known in the art as being a clearly perceptive and/or a translucent pattern or design printed or impressed onto or embedded into a substrate, such as paper, and visible to unaided human eyes when the substrate is held to ordinary ambient light. A translucent watermark transmits light, but in a manner which causes sufficient diffusion to eliminate perception of at least a part of a distinct image of the watermark.

A particular authentication mark may be a single essentially flat and smooth two-dimensional pattern or design, or, a single elevated or contoured and rough, three-dimensional pattern or design characterized by a three-dimensional morphological or geometrical shape, form, or structure. Alternatively, a particular authentication mark may be a plurality or composite (physical overlay) of two or more single essentially flat and smooth two-dimensional patterns or designs, or, a plurality or composite (physical overlay) of two or more single elevated or contoured and rough, three-dimensional patterns or designs each characterized by a three-dimensional morphological or geometrical shape, form, or structure. Alternatively, a particular authentication mark may be a combination (physical overlay) of at least one single essentially flat and smooth two-dimensional pattern or design, and at least one single elevated or contoured and rough, three-dimensional pattern or design characterized by a three-dimensional morphological or geometrical shape, form, or structure.

In general, when electromagnetic radiation, for example, in the form of light such as that supplied by an imaging type of illuminating or energy source, is incident upon any of the above types of authentication marks, the electromagnetic radiation is affected by one or more of the materials or substances making up the authentication mark, by any combination of electromagnetic radiation absorption, diffusion, reflection, diffraction, scattering, or/and transmission, mechanisms. Moreover, typically, any of the above types of authentication marks includes one or more materials or substances which exhibit some degree or extent of fluorescent or/and phosphorescent properties, characteristics, and behavior, when illuminated by different types of electromagnetic radiation or light, such as infrared, visible, and ultra-violet, types of light. The affected electromagnetic radiation, in the form of diffused, reflected, diffracted, scattered, or/and transmitted, electromagnetic radiation emitted by, or/and emerging from, the materials or substances of the authentication mark, for example, via fluorescence or/and phosphorescence, is directly and uniquely related to the physicochemical properties, characteristics, and behavior, of the materials or substances of the authentication mark, and therefore can be used for obtaining a spectral ('fingerprint' or 'signature') pattern type of identification of the authentication mark itself. Such spectrally based characteristics, behavior, and phenomena, of authentication marks have been successfully used as the basis for a wide variety of different types of spectroscopic (spectral) techniques, involving automatic pattern recognition (APR) or/and optical character recognition (OCR) types of imaging analysis, for authenticating authentic articles, and in a complementary empirically deductive manner, for determining non-authenticity of non-authentic (fake or counterfeit) articles.

The scope of the present invention encompasses the field of article authentication, including methods, devices, and systems, for authenticating authentic articles, and for protecting authenticity of authentic articles, which are based on spectroscopic (spectral) techniques involving automatic pattern recognition or/and optical character recognition types of imaging analysis. A few selected examples of recent disclosures and teachings in this field are: U.S. Pat. No. 6,616,964, to Hampp et al., entitled: "Method And Preparation For The Photochromic Marking And/Or For Securing The Authenticity Of Objects"; U.S. Pat. No. 6,610,351, to Shchegolikhin et al., entitled: "Raman-Active Taggants And Their Recognition"; U.S. Pat. No. 6,580,819, to Rhoads, entitled: "Methods Of Producing Security Documents Having Digitally Encoded Data And Documents Employing Same"; U.S. Pat. No. 6,373,965, to Liang, entitled: "Apparatus And Methods For Authenticiation Using Partially Fluorescent Graphic Images And OCR Characters"; and U.S. Pat. No. 6,364,994, to Curiel, entitled: "Tamper Evident And Counterfeit Resisting Informational Article And Associated Method".

As previously stated hereinabove, the field of article authentication, including methods, devices, and systems, for authenticating authentic articles, and for protecting authenticity of authentic articles, is relatively well developed and sophisticated. Unfortunately, however, technologies and activities used for counterfeiting and/or illegally producing, distributing or circulating, using, and/or selling, authentic articles, have similarly become well developed and quite sophisticated, especially on a global international basis. There is a strong need for 'keeping at least one, hopefully, more than one, step ahead' of such developed and sophisticated counterfeit and/or illegal technologies and activities.

There is thus a need for, and it would be highly advantageous to have a method for authenticating an authentic article having an authentication mark, using spectral imaging and analysis.

SUMMARY OF THE INVENTION

The present invention relates to a method for authenticating an authentic article having an authentication mark, using spectral imaging and analysis.

Thus, according to the present invention, there is provided a method for authenticating an authentic article having an authentication mark, comprising: (a) acquiring a set of spectral images of at least a part of the authentication mark; (b) forming a set of single-authentication mark spectral fingerprint data from the set of acquired spectral images of the imaged authentication mark; (c) identifying at least one spectral shift in the set of single-authentication mark spectral fingerprint data associated with the imaged authentication mark, for forming an intra-authentication mark physicochemical region group including a plurality of sub-sets of intra-authentication mark spectral fingerprint pattern data, such that value of at least one selected data element in each the sub-set is shifted relative to value of each corresponding the data element in each remaining sub-set in the same intra-authentication mark physicochemical region group; (d) forming a set of intra-authentication mark physicochemical properties and characteristics data relating to the imaged authentication mark, by performing pattern recognition and classification analysis on the intra-authentication mark physicochemical region group of the imaged authentication mark; and (e) comparing and matching values of elements in the set of intra-authentication mark physicochemical properties and characteristics data relating to the imaged authentication mark to values of corresponding reference elements in a reference set of intra-authentication mark physicochemical properties and characteristics data of the authentic article, thereby authenticating the authentic article.

In the event that a 'non-authentic' article having a non-authentic (fake or counterfeit) authentication mark is subjected to the method of the present invention, the authentication method will provide an unambiguous and accurate mismatch between values of elements in the set of intra-authentication mark physicochemical properties and characteristics data relating to the imaged 'non-authentic' authentication mark and corresponding values of reference elements in a reference set of intra-authentication mark physicochemical properties and characteristics data of the authentic article, thereby unambiguously determining the non-authenticity of the non-authentic article.

The present invention is generally applicable to a wide variety of different types of authentic articles and is generally applicable to a wide variety of different types of authentication marks. The article authentication method of the present invention is generally applicable to essentially any type of authentic article having at least one authentication mark which exhibits spectrally based characteristics, behavior, and phenomena, that can be detected, recorded, and analyzed, using spectroscopic (spectral) techniques involving automatic pattern recognition (APR) or/and optical character recognition (OCR) types of imaging analysis, for authenticating the authentic article. The article authentication method of the present invention is particularly applicable to essentially any type of printed authentic article including essentially any type(s) of authentication mark(s) having any particulate or/and non-particulate type of two-dimensional or/and three-dimensional topological, morphological, and geometrical, configuration, shape, or form, and being composed of essentially any number and type(s) of chemical, physical, biochemical, molecular biological, or/and biological, material(s) or substance(s). In a complementary empirically deductive manner, the article authentication method of the present invention is generally applicable for determining non-authenticity of non-authentic (fake or counterfeit) articles.

The present invention can be implemented by performing procedures, steps, and sub-steps, in a manner selected from the group consisting of manually, semi-automatically, fully automatically, and a combination thereof, involving operation of structures, mechanisms, assemblies, components, and elements, in a manner selected from the group consisting of manual, semi-automatic, filly automatic, and a combination thereof. Moreover, according to actual procedures, steps, and sub-steps, structures, mechanisms, assemblies, components, and elements, used for implementing a particular embodiment of the disclosed invention, the procedures, steps, and sub-steps, are performed by using hardware, software, or an integrated combination thereof, and, the structures, mechanisms, assemblies, components, and elements, operate by using hardware, software, or an integrated combination thereof.

In particular, software used for implementing the present invention includes operatively connected and functioning written or printed data, in the form of software programs, software routines, software sub-routines, software symbolic languages, software code, software instructions or protocols, or a combination thereof. Hardware used for implementing the present invention includes operatively connected and functioning electronic, optical, and electro-optical, structures, mechanisms, assemblies, components, elements, materials, and combinations thereof, involving digital and/or analog operations. Accordingly, an integrated combination of (1) software and (2) hardware, used for implementing the present invention, includes an integrated combination of (1) operatively connected and functioning written or printed data, in the form of software programs, software routines, software sub-routines, software symbolic languages, software code, software instructions or protocols, or a combination thereof, and (2) operatively connected and functioning electronic, optical, and electro-optical, structures, mechanisms, assemblies, components, elements, materials, and combinations thereof, involving digital and/or analog operations.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative description of the preferred embodiments of the present invention only, and are presented in the cause of providing what is believed to be the most useful and readily understood description of the principles and conceptual aspects of the present invention. In this regard, no attempt is made to show structural details of the present invention in more detail than is necessary for a fundamental understanding of the invention, the description taken with the drawings making apparent to those skilled in the art how the several forms of the invention maybe embodied in practice. In the drawings.

DESCRIPTION OF THE PREFERRED EMBODIMENTS

Figure 1:
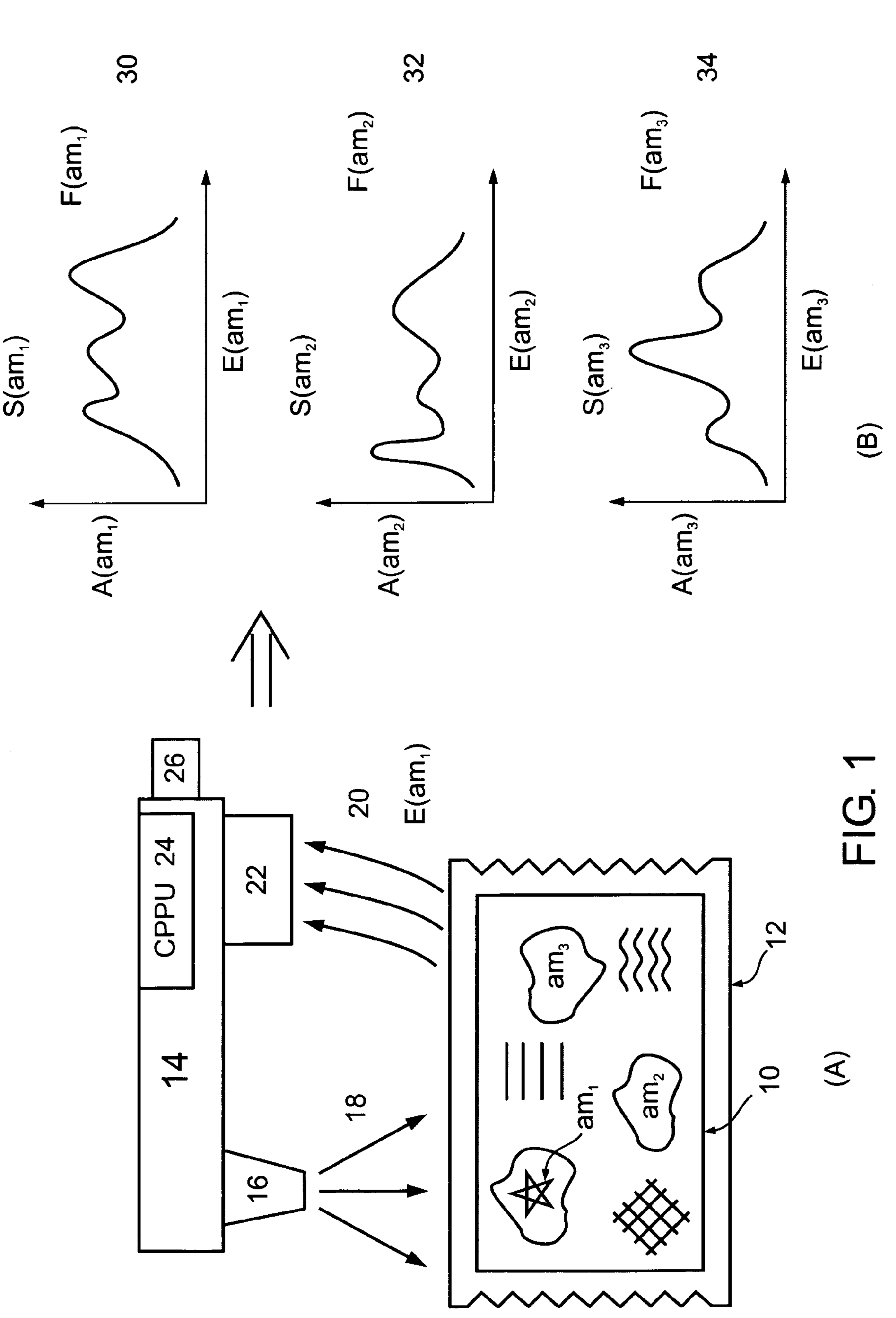
FIG. 1 is a schematic diagram illustrating spectral imaging of an exemplary authentic article which includes three exemplary authentication marks, $am_1$, $am_2$, and $am_3$, in accordance with the present invention.

The present invention relates to a method for authenticating an authentic article having an authentication mark, using spectral imaging and analysis.

The article authentication method of the present invention is generally applicable to essentially any type of authentic article having at least one authentication mark which exhibits spectrally based characteristics, behavior, and phenomena, that can be detected, recorded, and analyzed, using spectroscopic (spectral) techniques involving automatic pattern recognition (APR) or/and optical character recognition (OCR) types of imaging analysis, for authenticating the authentic article. The article authentication method of the present invention is particularly applicable to essentially any type of printed authentic article including essentially any type(s) of authentication mark(s) having any particulate or/and non-particulate type of two-dimensional or/and three-dimensional topological, morphological, and geometrical, configuration, shape, or form, and being composed of essentially any number and type(s) of chemical, physical, biochemical, molecular biological, or/and biological, material(s) or substance(s). In a complementary empirically deductive manner, the article authentication method of the present invention is generally applicable for determining non-authenticity of non-authentic (fake or counterfeit) articles.

The generalized method for authenticating an authentic article having an authentication mark, using spectral imaging and analysis, of the present invention, includes the following main steps of: (a) acquiring a set of spectral images of at least a part of the authentication mark; (b) forming a set of single-authentication mark spectral fingerprint data from the set of acquired spectral images of the imaged authentication mark; (c) identifying at least one spectral shift in the set of single-authentication mark spectral fingerprint data associated with the imaged authentication mark, for forming an intra-authentication mark physicochemical region group including a plurality of sub-sets of intra-authentication mark spectral fingerprint pattern data, such that value of at least one selected data element in each the sub-set is shifted relative to value of each corresponding the data element in each remaining sub-set in the same intra-authentication mark physicochemical region group; (d) forming a set of intra-authentication mark physicochemical properties and characteristics data relating to the imaged authentication mark, by performing pattern recognition and classification analysis on the intra-authentication mark physicochemical region group of the imaged authentication mark; and (e) comparing and matching values of elements in the set of intra-authentication mark physicochemical properties and characteristics data relating to the imaged authentication mark to values of corresponding reference elements in a reference set of intra-authentication mark physicochemical properties and characteristics data of the authentic article, thereby authenticating the authentic article.

In the event that a 'non-authentic' article having a non-authentic (fake or counterfeit) authentication mark is subjected to the method of the present invention, the authentication method will provide an unambiguous and accurate mismatch between values of elements in the set of intra-authentication mark physicochemical properties and characteristics data relating to the imaged 'non-authentic' authentication mark and corresponding values of reference elements in a reference set of intra-authentication mark physicochemical properties and characteristics data of the authentic article, thereby unambiguously determining the non-authenticity of the non-authentic article.

The method for authenticating an authentic article having an authentication mark, using spectral imaging and analysis, of the present invention, is based on, but not limited to, the main aspect of novelty and inventiveness of the sequential combination of steps involving: identifying relatively small shifts in spectral parameters, in particular, intensity or amplitude, and energy (in terms of wavelength, frequency, or wavenumber), of electromagnetic radiation emitted by at least a part of an authentication mark, in a set of single-authentication mark spectral fingerprint data formed from acquired spectral images of the imaged authentication mark; using the spectral shift data and information for forming an intra-authentication mark physicochemical region group; performing pattern recognition and classification analysis on the intra-authentication mark physicochemical region group of the imaged authentication mark, for forming a set of intra-authentication mark physicochemical properties and characteristics data; and then comparing and matching values of elements in the set of intra-authentication mark physicochemical properties and characteristics data relating to the imaged authentication mark to values of corresponding reference elements in a reference set of intra-authentication mark physicochemical properties and characteristics data of the authentic article, thereby authenticating the authentic article.

The intra-authentication mark physicochemical region group formed from using the spectral shift data and information includes a plurality of sub-sets of intra-authentication mark spectral fingerprint pattern data, such that the value of at least one selected data element in each sub-set is shifted (on the order of about 0.1% or ppt (parts per thousand) level) relative to the value of each corresponding data element in each remaining sub-set in the same intra-authentication mark physicochemical region group. The set of intra-authentication mark physicochemical properties and characteristics data of the materials or substances of the authentication mark (for example, in the case of printed paper currency, the physicochemical properties and characteristics of the ink, dye, micro-sized non-metallic or metallic fibers, threads, or ribbons, and, the physicochemical properties and characteristics of the paper substrate thereof), relating to the imaged authentication mark is formed by performing pattern recognition and classification analysis on the intra-authentication mark physicochemical region group of the imaged authentication mark. Then, there is comparing and matching values of elements in the set of intra-authentication mark physicochemical properties and characteristics data relating to the imaged authentication mark to values of corresponding reference elements in a reference set of intra-authentication mark physicochemical properties and characteristics data of the authentic article, thereby authenticating the authentic article.

It is to be understood that the present invention is not limited in its application to the details of the order or sequence, and number, of procedures, steps, and sub-steps, of operation or implementation of the authentication method, or to the details of type, composition, construction, arrangement, order, and number, of the devices, mechanisms, assemblies, structures, components, elements, and materials, of the spectral imaging and analysis system, set forth in the following description and accompanying drawings. For example, the following illustrative description includes complete details for spectral imaging and analysis of a single authentication mark of an authentic article, for authenticating the authentic article, in order to illustrate implementation of the present invention. In practice, preferably, more than one authentication mark of an authentic article is subjected to the authentication method of the present invention, for authenticating the authentic article. Additionally, for example, the following description refers to spectral imaging and analysis, in general, in order to illustrate implementation of the present invention. It is to be clearly understood that the method and device of the present invention can be implemented according to different specific types of spectral imaging and analysis, for example, hyper-spectral imaging and analysis, focus-fusion spectral imaging and analysis, modifications thereof, and combinations thereof, well known in the art and technology of spectral imaging and analysis. Accordingly, the present invention is capable of other embodiments and of being practiced or carried out in various ways. Although procedures, steps, sub-steps, and devices, mechanisms, assemblies, structures, components, elements, and materials, similar or equivalent to those described herein can be used for practicing or testing the present invention, suitable procedures, steps, sub-steps, and devices, mechanisms, assemblies, structures, components, elements, and materials, are described herein.

It is also to be understood that unless otherwise defined, all technical and scientific words, terms, and/or phrases, used herein throughout the present disclosure have either the identical or similar meaning as commonly understood by one of ordinary skill in the art to which this invention belongs. Phraseology, terminology, and, notation, employed herein throughout the present disclosure are for the purpose of description and should not be regarded as limiting. Moreover, all technical and scientific words, terms, and/or phrases, introduced, defined, described, and/or exemplified, in the above Background section, are equally or similarly applicable in the following illustrative description of the embodiments, examples, and appended claims, of the present invention. Additionally, as used herein, the term 'about' refers to ±10% of the associated value.

Procedures, steps, sub-steps, structures, mechanisms, assemblies, components, elements, materials, operation, implementation, of exemplary preferred embodiments, alternative preferred embodiments, specific configurations, and, additional and optional aspects, characteristics, or features, thereof, of a method for authenticating an authentic article having an authentication mark, using spectral imaging and analysis, according to the present invention, are better understood with reference to the following illustrative description and accompanying drawings.

In the following illustrative description of the method of the present invention, included are main or principal procedures, steps, and sub-steps, and main or principal devices, mechanisms, assemblies, structures, components, elements, and materials, and functions thereof, needed for sufficiently understanding proper 'enabling' utilization and implementation of the disclosed method. Accordingly, description of various possible required and/or optional preliminary, intermediate, minor, procedures, steps, sub-steps, devices, mechanisms, assemblies, structures, components, elements, and/or materials, and/or functions thereof, which are readily known by one of ordinary skill in the art, and/or which are available in the prior art and technical literature relating to spectroscopic imaging and analysis, in general, and to spectral imaging and analysis, in particular, are at most only briefly indicated herein.

In Step (a) of the method for authenticating an authentic article having an authentication mark, of the present invention, there is acquiring a set of spectral images of at least a part of the authentication mark.

Step (a) is performed according to the same applicant disclosures of U.S. Pat. No. 5,880,830, disclosing a "Method For On-line Analysis Of Polycyclic Aromatic Hydrocarbons In Aerosols"; U.S. Pat. No. 6,091,843, disclosing a "Method Of Calibration And Real-time Analysis Of Particulates"; U.S. Pat. No. 6,438,261, disclosing a "Method For In-situ Focus-fusion Multi-layer Spectral Imaging And Analysis Of Particulate Samples"; U.S. Pat. No. 6,694,048, disclosing a "Method For Generating Intra-particle Morphological Concentration/Density Maps And Histograms Of A Chemically Pure Particulate Substance"; U.S. Pat. No. 6,697,510, disclosing a "Method For Generating Intra-particle Crystallographic Parameter Maps And Histograms Of A Chemically Pure Crystalline Particulate Substance"; and PCT Pat. Appl. No. IL03/00292, having International Publication No. WO 03/085371, disclosing "Real Time High Speed High Resolution Hyper-spectral Imaging", the teachings of each of which are incorporated by reference for all purposes as if fully set forth herein.

For understanding and implementing the present invention, particularly with respect to Step (a), the following illustrative description, integrating teachings of the above cited same applicant disclosures, along with reference to FIG. 1 of the present disclosure, is herein provided.

Reference is now made to the drawings, wherein FIG. 1 is a schematic diagram illustrating spectral imaging of an exemplary authentic article, hereinafter, referred to as authentic article 10, which includes three exemplary authentication marks, hereinafter, referred to as authentication marks $am_1$, $am_2$, and $am_3$. As shown in side (A), authentic article 10 is positioned upon a support device or mechanism 12, which either statically supports and holds, or/and dynamically supports, holds, and transports, authentic article 10, while authentic article 10 is spectrally imaged and analyzed by a spectral imaging and analysis system 14.

Authentic article 10 is any type of authentic article. In a non-limiting manner, for illustrative purposes, as illustrated in FIG. 1, authentic article 10 represents a printed paper type of authentic article, wherein authentication marks $am_1$, $am_2$, and $am_3$, exhibit spectrally based characteristics, behavior, and phenomena, that can be detected, recorded, and analyzed, using spectroscopic (spectral) techniques involving automatic pattern recognition (APR) or/and optical character recognition (OCR) types of imaging analysis. Authentication marks $am_1$, $am_2$, and $am_3$, have a particulate or/and a non-particulate type of two-dimensional or/and three-dimensional topological, morphological, and geometrical, configuration, shape, or form, and are composed of chemical, physical, biochemical, molecular biological, or/and biological, material(s) or substance(s).

Authentic article 10 is, for example, a printed paper form of a monetary currency, a bank note, a check, a company or stock certificate; a printed plastic (laminated) card form of a monetary currency, such as a credit card, a debit card, a phone card, a personal travel or entertainment card, or a vehicular toll card; a printed paper or plastic (laminated) card form of an identification or other type of legal document, such as a birth certificate, a wedding certificate, a divorce certificate, a death certificate, an ID card, a drivers license, a passport, a visa, or an immigration document.

Authentication marks $am_1$, $am_2$, and $am_3$, are composed of, or include, any number of a variety of different types of chemical, physical, biochemical, molecular biological, or biological, materials or substances, singly or/and in combination. For example, authentication marks $am_1$, $am_2$, and $am_3$, may be composed of, or include, chemical types of materials or substances, such as inks and dyes, which are especially used in processes for printing printed types of authentic articles. Authentication marks $am_1$, $am_2$, and $am_3$, may be composed of, or include, physical types of materials or substances, such as micro-sized non-metallic or metallic fibers, threads, or ribbons, or, micro-sized printed integrated electronic circuits or chips. Authentication marks $am_1$, $am_2$, and $am_3$, may be composed of, or include, biochemical and molecular biological types of materials or substances, such as protein or nucleic acid (DNA) molecules or molecular fragments. Authentication marks $am_1$, $am_2$, and $am_3$, may be composed of, or include, biological types of materials or substances, such as non-living or living microorganisms, for example, bacteria or viruses.

Authentication marks $am_1$, $am_2$, and $am_3$, may be composed of, or include, materials or substances including a single type of an ink or dye, or including a variety of different types of inks or/and dyes. Accordingly, authentication marks $am_1$, $am_2$, and $am_3$, made from a material or substance including ink or/and dye, may be of a single color, or of a variety of several different colors. Ink or dye used for making or printing authentication marks $am_1$, $am_2$, and $am_3$, typically includes an aqueous or organic solvent base, and includes one or more pigments in a completely dissolved form, in a partially dissolved or suspension form, or in a solid (micron sized fine powder) form. Such pigments are organic or inorganic based substances used as coloring, where, in a dry particulate form, consist of particles or aggregates of particles. Authentication marks $am_1$, $am_2$, and $am_3$, made from materials or substances including inks or/and dyes, may be in a form of an alphabetic, numeric, alphanumeric, or/and picture, code, symbol, pattern, or design.

Authentication marks $am_1$, $am_2$, and $am_3$, as viewed by unaided human eyes, and touched by a human hand, may feature an essentially flat and smooth two-dimensional pattern or design, or, feature an elevated or contoured and rough, three-dimensional pattern or design characterized by a three-dimensional morphological or geometrical shape, form, or structure. Authentication marks $am_1$, $am_2$, and $am_3$, may be any of a wide variety of different types of watermarks, where a watermark is generally considered as being a clearly perceptive and/or a translucent pattern or design printed or impressed onto or embedded into a substrate, such as paper, and visible to unaided human eyes when the substrate is held to ordinary ambient light. A translucent watermark transmits light, but in a manner which causes sufficient diffusion to eliminate perception of at least a part of a distinct image of the watermark.

Authentication marks $am_1$, $am_2$, and $am_3$, may be a single essentially flat and smooth two-dimensional pattern or design, or, a single elevated or contoured and rough, three-dimensional pattern or design characterized by a three-dimensional morphological or geometrical shape, form, or structure. Alternatively, authentication marks $am_1$, $am_2$, and $am_3$, may be a plurality or composite (physical overlay) of two or more single essentially flat and smooth two-dimensional patterns or designs, or, a plurality or composite (physical overlay) of two or more single elevated or contoured and rough, three-dimensional patterns or designs each characterized by a three-dimensional morphological or geometrical shape, form, or structure. Alternatively, authentication marks $am_1$, $am_2$, and $am_3$, may be a combination (physical overlay) of at least one single essentially flat and smooth two-dimensional pattern or design, and at least one single elevated or contoured and rough, three-dimensional pattern or design characterized by a three-dimensional morphological or geometrical shape, form, or structure.

In general, when electromagnetic radiation, for example, in the form of light such as that supplied by an imaging type of illuminating or energy source, is incident upon any of authentication marks $am_1$, $am_2$, and $am_3$, the electromagnetic radiation is affected by one or more of the materials or substances making up authentication marks $am_1$, $am_2$, and $am_3$, by any combination of electromagnetic radiation absorption, diffusion, reflection, diffraction, scattering, or/and transmission, mechanisms. Moreover, preferably, authentication marks $am_1$, $am_2$, and $am_3$, include one or more materials or substances which exhibit some degree or extent of fluorescent or/and phosphorescent properties, characteristics, and behavior, when illuminated by different types of electromagnetic radiation or light, such as infrared, visible, and ultra-violet, types of light. The affected electromagnetic radiation, in the form of diffused, reflected, diffracted, scattered, or/and transmitted, electromagnetic radiation emitted by, or/and emerging from, the materials or substances of authentication marks $am_1$, $am_2$, and $am_3$, for example, via fluorescence or/and phosphorescence, is directly and uniquely related to the physicochemical properties, characteristics, and behavior, of the materials or substances of authentication marks $am_1$, $am_2$, and $am_3$, and therefore can be used for obtaining spectral ('fingerprint' or 'signature') pattern type of identifications of authentication marks $am_1$, $am_2$, and $am_3$. The spectral (fingerprint or signature) pattern type of identifications of authentication marks $am_1$, $am_2$, and $am_3$, are used as part of the spectral imaging analysis of the authentication method of the present invention, for authenticating authentic article 10, and in a complementary empirically deductive manner, can be used for determining non-authenticity of a non-authentic (fake or counterfeit) article.

Support device or mechanism 12 is an appropriately designed, constructed, and operative, support device or mechanism which is enabled for statically supporting and holding authentic article 10 as part of a single-stage stand-alone authentic article handling or/and manufacturing process, wherein authentic article 10 is spectrally imaged and analyzed by spectral imaging and analysis system 14. Alternatively, support device or mechanism 12 is an appropriately designed, constructed, and operative, support device or mechanism which is enabled for dynamically (in a discontinuous (staggered) or continuous manner) supporting, holding, and transporting, authentic article 10 as an off-line, on-line, or in-line, part of a multi-stage sequential authentic article handling or/and manufacturing process, wherein authentic article 10 is spectrally imaged and analyzed by spectral imaging and analysis system 14. Accordingly, support device or mechanism 12 is, for example, part of a two-dimensionally adjustable (xy) translation stage or platform, or part of a three-dimensionally adjustable (xyz) translation stage or platform, included in, and used as part of, an overall spectral imaging and analysis system, for example, spectral imaging and analysis system 14.

For example, for an embodiment of the present invention wherein authentic article 10 represents a printed paper type of authentic article, such as a printed paper form of a monetary currency, a bank note, a check, a company or stock certificate, then an exemplary single-stage or multi-stage authentic article handling or/and manufacturing process may involve variable (slow, medium, high, ultra-high) speed counting or/and sorting of a plurality of authentic articles 10, for example, as implemented by a financial institution, such as a bank, or by a governmental agency, such as a national bureau of engraving and printing of paper currency. Accordingly, in such an embodiment, either each, or a pre-determined number, of the plurality of authentic articles 10 is spectrally imaged and analyzed by spectral imaging and analysis system 14, either before or after there is counting or/and sorting of the plurality of authentic articles 10.

The authentication method of the present invention is implemented by appropriately designing, constructing, and operating, spectral imaging and analysis system 14 for generating, detecting, acquiring, measuring, processing, analyzing, and optionally, displaying, spectral imaging data and information. For performing the tasks of generating, detecting, acquiring, measuring, processing, analyzing, and optionally, displaying, spectral imaging data and information, in general, spectral imaging and analysis system 14 includes as main components, an illumination energy source and optics unit 16, for generating and optically supplying electromagnetic radiation 18 to authentication marks $am_1$, $am_2$, and $am_3$ of authentic article 10; an optical energy detector unit 22, for optically detecting affected energy or emission beam 20 emitted by, or emerging from, authentication marks $am_1$, $am_2$, and $am_3$ of authentic article 10; a central programming and control/data/information signal processing unit (CPPU) 24; and optionally, a display unit 26.

Spectral imaging and analysis system 14 is appropriately designed, constructed, and operative, such that the authentication method of present invention is implemented according to any of a variety of different specific modes of real time or near real time, off-line, on-line, or in-line, stationary, discontinuous (staggered), or continuous, low or high speed, high resolution, spectral imaging and analysis.

For example, in a preferred embodiment of implementing the authentication method of the present invention, spectral imaging and analysis system 14 is appropriately designed, constructed, and operative, according to a regular or standard mode of spectral imaging and analysis, for example, as illustratively described in same applicant disclosures of U.S. Pat. Nos. 5,880,830 and 6,091,843. In another preferred embodiment of implementing the authentication method of the present invention, spectral imaging and analysis system 14 is appropriately designed, constructed, and operative, according to a focus-fusion mode of spectral imaging and analysis, for example, as illustratively described in same applicant disclosure of U.S. Pat. No. 6,438,261, in particular, involving the use of support device or mechanism 12 being part of a three-dimensionally adjustable (xyz) translation stage or platform. In yet another preferred embodiment of implementing the authentication method of the present invention, spectral imaging and analysis system 14 is appropriately designed, constructed, and operative, according to a high speed high resolution hyper-spectral mode of spectral imaging and analysis, for example, as illustratively described in same applicant disclosure of PCT Pat. Appl. No. IL03/00292, having International Publication No. WO 03/085371, in particular, involving a specially designed, constructed, and operative, piezoelectric optical interferometer.

The authentication method of the present invention is implemented by appropriately designing, constructing, and operating, spectral imaging and analysis system 14 according to a variety of different ranges of authentic article imaging and analysis throughput time. The authentic article imaging and analysis throughput time is the time required for performing the entire process of the spectral imaging and analysis of each authentic article 10, encompassing the time from initiating step (a) of acquiring a set of spectral images of authentication marks $am_1$, $am_2$, and $am_3$, through the time of completing step (e) of comparing and matching values of elements in a set of intra-authentication mark physicochemical properties and characteristics data to values of corresponding reference elements in a reference set of intra-authentication mark physicochemical properties and characteristics data of authentic article 10, for authenticating authentic article 10, or alternatively, for determining the non-authenticity of a non-authentic article.

For example, in a preferred embodiment of implementing the authentication method of the present invention, spectral imaging and analysis system 14 is appropriately designed, constructed, and operative, according to an off-line stationary mode, such that the throughput time for performing the entire process of the spectral imaging and analysis of each authentic article 10 is in a range of between about 10 sec and about 60 sec. Such a preferred embodiment is most appropriate for applications involving research and development or investigation of individual or single authentic articles 10, for example, as might be performed in an academic, industrial, or governmental, facility.

In another preferred embodiment of implementing the authentication method of the present invention, spectral imaging and analysis system 14 is appropriately designed, constructed, and operative, according to a high speed discontinuous (staggered) mode, such that the authentic article imaging and analysis throughput time for each authentic article 10 is in a range of between about 100 milliseconds and about 60 sec. Such a preferred embodiment is most appropriate for applications involving medium or high speed counting or/and sorting of a plurality of authentic articles 10, for example, as performed by a financial institution, such as a central bank, or a governmental agency.

In yet another preferred embodiment of implementing the authentication method of the present invention, spectral imaging and analysis system 14 is appropriately designed, constructed, and operative, according to a high or ultra-high speed continuous mode, for example, by including an automatic high speed optical line scanner, for continuously scanning individual lines of each of a plurality of authentic articles 10, such that the authentic article imaging and analysis throughput time for each authentic article 10 is in a range of between about 10 milliseconds and about 100 milliseconds. Such a preferred embodiment is most appropriate for applications involving high or ultra-high speed counting or/and sorting of a plurality of authentic articles 10, for example, as performed by a financial institution, such as a local bank.

Illumination energy source and optics unit 16 is for generating and optically supplying electromagnetic radiation 18 to authentication marks $am_1$, $am_2$, and $am_3$ of authentic article 10. Generated electromagnetic radiation 18 is incident upon at least a part of an authentication mark, for example, authentication mark $am_1$ (shown in FIG. 1 as an exemplary five-sided star) of authentic article 10.

Preferably, incident electromagnetic radiation 18 is in the form of light, selected from the group consisting of polychromatic light, monochromatic light, poly- or multi-monochromatic light, and, combinations thereof. An exemplary polychromatic light is white light. An exemplary monochromatic light is selected from the group consisting of visible (VIS) spectrum monochromatic light, in the range of 350-750 nm, such as red light, blue light, or green light, and, invisible spectrum monochromatic light, such as ultra-violet (UV) light, in the range of 100-350 nm, or infrared (IR) light, in the range of 750 nm-0.5 mm. An exemplary poly- or multi-chromatic light is a combination of a plurality of at least two different previously listed exemplary monochromatic lights.

Illumination energy source and optics unit 16 is operated by selecting a range of incident electromagnetic radiation 18 and by focusing the selected range of electromagnetic radiation 18 which is incident upon the selected part of authentication mark $am_1$ of authentic article 10. Illumination energy source and optics unit 16 includes, for example, optical filtering and focusing mechanisms. An optical filtering mechanism, for example, a rotatable set of several optical filters, can be used for selectively filtering incident electromagnetic radiation 18 according to a pre-determined range of a single wavelength, or, according to a pre-determined range of a plurality of wavelengths, of the electromagnetic radiation generated by illumination energy source and optics unit 16, for forming a filtered incident electromagnetic radiation 18. A focusing mechanism, for example, a lens, can be used for focusing filtered incident electromagnetic radiation 18, for forming a filtered and focused incident electromagnetic radiation 18, which is transmitted to, and incident upon, the selected part of authentication mark $am_1$ of authentic article 10.

As illustrated in FIG. 1, spectral imaging and analysis system 14 includes a single illumination energy source and optics unit 16, for transmitting incident electromagnetic radiation 18 upon the selected part of authentication mark $am_1$. In an alternative embodiment of the present invention, spectral imaging and analysis system 14 can include a plurality of two or more separately operable or multiplexed individual illumination energy source and optical units 16, along with appropriately positioned filtering and focusing mechanisms, for transmitting filtered and focused incident electromagnetic radiation 18, of different individual wavelengths, upon the selected part of authentication mark $am_1$.

For specific implementation of the present invention in accordance with the method for in-situ focus-fusion multi-layer spectral imaging and analysis of particulate samples as disclosed in same applicant disclosure of U.S. Pat. No. 6,438,261, in Step (a), there is scanning authentic article 10, by adjusting and setting spectral imaging and analysis system 14 for spectral imaging at a selected field of view, $FOV_i$, over the selected part of authentication mark $am_1$, of authentic article 10, having central (x, y) coordinates relative to support device or mechanism 12 being part of a three-dimensionally adjustable (xyz) translation stage or platform, by moving support device or mechanism 12 increments of Δx and Δy. Then, there is acquiring a cube (spectral) plane image of authentication mark $am_1$, in the selected i-th field of view, $FOV_i$, at a selected j-th differential imaging or focusing distance, $\Delta z_{ij}$, by focusing spectral imaging and analysis system 14, by moving support device or mechanism 12 in the z-direction an increment Δz, until receiving a sharp gray level image of authentication mark $am_1$. This corresponds to adjusting and setting spectral imaging and analysis system 14 for spectral imaging authentication mark $am_1$ in the x-y plane of the i-th field of view, $FOV_i$, for a selected imaging distance defined along the z-axis between authentication mark $am_1$ and illumination energy source and optics unit 16 of spectral imaging and analysis system 14. This step of acquiring spectral data and information is used for constructing a single 'focused' cube (spectral) plane image of authentication mark $am_1$, in accordance with the method described in U.S. Pat. No. 6,438,261.

In addition to applying the method disclosed in U.S. Pat. No. 6,438,261, and not described or suggested in that disclosure, in Step (a) of the present invention, there is further sub-incrementally scanning authentication mark $am_1$, by 'finely' adjusting and setting spectral imaging and analysis system 14 for obtaining a plurality of spectral images by spectral imaging within a same selected field of view, $FOV_i$, over authentication mark $am_1$ having central (x, y) coordinates relative to support device or mechanism 12, by finely moving support device or mechanism 12 sub-increments of $\Delta x'$ and $\Delta y'$. Further sub-incrementally scanning authentication mark $am_1$ by finely moving support device or mechanism 12 sub-increments of $\Delta x'$ and $\Delta y'$, is advantageously performed for enhancing and improving spatial acquisition and spatial pattern recognition and classification analysis of the focus-fusion multi-layer and multi-intra field of view spectral imaging data and information relating to physicochemical properties and characteristics of the materials or substances making up authentication mark $am_1$.

Then, there is acquiring a corresponding plurality of cube (spectral) plane images of authentication mark $am_1$, within the same selected i-th field of view, $FOV_i$, at the selected j-th differential imaging or focusing distance, $\Delta z_{ij}$, by focusing spectral imaging and analysis system 14 by moving support device or mechanism 12 in the z-direction an increment $\Delta z$, until receiving a sharp gray level image of authentication mark $am_1$. This corresponds to adjusting and setting spectral imaging and analysis system 14 for spectral imaging authentication mark $am_1$ at a plurality of x, y positions or coordinates in the x-y plane of the same i-th field of view, $FOV_i$, for a selected imaging distance defined along the z-axis between authentication mark $am_1$ and illumination energy source and optics unit 16 of spectral imaging and analysis system 14. This step of acquiring spectral data and information is used for constructing a plurality of single 'focused' cube (spectral) plane images of authentication mark $am_1$, in accordance with the method described in U.S. Pat. No. 6,438,261. Thus, in authentic article 10, for each imaged authentication mark, for example, for each imaged authentication mark $am_1$, $am_2$, and $am_3$, a set of spectral images, in general, and a set of focus-fusion multi-layer spectral images, in particular, is acquired. The plurality of sets of spectral images, in general, and sets of focus-fusion multi-layer spectral images, in particular, are stored in a single-authentication mark spectral image database.

Incident electromagnetic radiation 18 is affected by one or more of the materials or substances making up authentication mark $am_1$, by any combination of electromagnetic radiation absorption, diffusion, reflection, diffraction, scattering, or/and transmission, mechanisms. At least a part of incident electromagnetic radiation 18 which is affected by the materials or substances of authentication mark $am_1$, is subsequently emitted by the materials or substances of authentication mark $am_1$, in the form of affected energy or emission beam, $E(am_1)$, 20. Affected energy 20, being in the form of an emission beam, is detected by optical energy detector unit 22 of spectral imaging and analysis system 14.

Preferably, authentication mark $am_1$ includes one or more materials or substances which exhibit some degree or extent of fluorescent or/and phosphorescent properties, characteristics, and behavior, when illuminated by incident electromagnetic radiation 18. Affected electromagnetic radiation, $E(am_1)$, 20, of authentication mark $am_1$, in the form of diffused, reflected, diffracted, scattered, or/and transmitted, electromagnetic radiation emitted by, or/and emerging from, the materials or substances of the authentication mark $am_1$, for example, via fluorescence or/and phosphorescence, is directly and uniquely related to the physicochemical properties, characteristics, and behavior, of the materials or substances of authentication mark $am_1$.

Optical energy detector unit 22 is for optically detecting affected energy or emission beam 20 emitted by, or emerging from, authentication marks $am_1$, $am_2$, and $am_3$ of authentic article 10. Optical energy detector unit 22 includes, for example, a CCD or diode array type of optical energy detecting device.

Central programming and control/data/information signal processing unit (CPPU) 24 is operatively connected to illumination energy source and optics unit 16 and to optical energy detector unit 22, and is for processing and analyzing data and information associated with incident electromagnetic radiation 18 generated and optically supplied by illumination energy source and optics unit 16 to authentication marks $am_1$, $am_2$, and $am_3$ of authentic article 10, and authentication mark affected energy or emission beam 20 detected by optical energy detector unit 22. From these sources of spectral data and information, there is acquiring and analyzing sets of spectral images of the illuminated part of authentication mark $am_1$.

As described below, in Steps (b)-(e), the acquired spectral images are used for forming, comparing, and matching, values of elements in a set of intra-authentication mark physicochemical properties and characteristics data relating to imaged authentication mark $am_1$ to values of corresponding reference elements in a reference set of intra-authentication mark physicochemical properties and characteristics data of authentic article 10, thereby authenticating authentic article 10.

Optionally, spectral imaging and analysis system 14 additionally includes a display unit 26, which is operatively connected to central programming and control/data/information signal processing unit (CPPU) 24, and is for displaying and/or indicating various forms of input and output data and information relating to overall control and operation of spectral imaging and analysis system 14, including, for example, the authentication results generated by central programming and control/data/information signal processing unit (CPPU) 24.

Thus, completion of Step (a) results in acquiring a set of spectral images representative of at least a part of authentication mark $am_1$ of authentic article 10. The set of spectral images is stored in a single-authentication mark spectral image database.

In Step (b), there is forming a set of single-authentication mark spectral fingerprint data from the set of acquired spectral images of the imaged authentication mark of the authentic article.

Step (b) is performed by using central programming and control/data/information signal processing unit (CPPU) 24 of spectral imaging and analysis system 14, and the data is stored in a single-authentication mark spectral fingerprint database.

With reference to side (B) of FIG. 1, for authentication mark $am_1$ of authentic article 10, the set of spectral images, acquired and stored by operating spectral imaging and analysis system 14, is used for forming a set of single-authentication mark spectral fingerprint data, $F(am_1)$. The set of single-authentication mark spectral fingerprint data, $F(am_1)$, is characterized by a single-authentication mark spectral fingerprint spectrum, $S(am_1)$, 30, featuring intensity or amplitude, $A(am_1)$, of the energy of authentication mark emission beam 20, herein, for brevity, referred to as emitted energy, E($am_1$), plotted as a function of emitted energy, E($am_1$), 20 detected by optical energy detector unit 22 during imaging authentication mark $am_1$ by spectral imaging and analysis system 14. Preferably, emitted energy, E($am_1$), 20 is expressed in terms of wavelength, frequency, or wavenumber, of electromagnetic radiation, such as fluorescent or phosphorescent light, emitted by authentication mark $am_1$ of authentic article 10. This data is stored in a single-authentication mark spectral fingerprint database.

This process is performed for each of authentication marks $am_1$, $am_2$, and $am_3$, as is clearly illustrated in FIG. 1. Accordingly, each set of single-authentication mark spectral fingerprint data, F($am_1$), F($am_2$), and F($am_3$), for each imaged authentication mark $am_1$, $am_2$, and $am_3$, respectively, is characterized by a single-authentication mark spectral fingerprint spectrum, S($am_1$), S($am_2$), and S($am_3$), respectively, referenced by 30, 32, and 34, respectively, featuring intensity or amplitude, A($am_1$), A($am_2$), and A($am_3$), respectively, of emitted energy 20, E($am_1$), E($am_2$), and E($am_3$), respectively, plotted as a function of emitted energy 20, E($am_1$), E($am_2$), and E($am_3$), respectively.

In Step (c), there is identifying at least one spectral shift in the set of single-authentication mark spectral fingerprint data associated with the imaged authentication mark, for forming an intra-authentication mark physicochemical region group including a plurality of sub-sets of intra-authentication mark spectral fingerprint pattern data, such that the value of at least one selected data element in each sub-set is shifted relative to the value of each corresponding data element in each remaining sub-set in the same intra-authentication mark physicochemical region group.

This spectral shift identification step is performed on the set of single-authentication mark spectral fingerprint data, F($am_1$), characterized by single-authentication mark spectral fingerprint spectrum, S($am_1$), 30, for forming an intra-authentication mark physicochemical region group of a plurality of sub-sets of intra-authentication mark spectral fingerprint pattern data, relating to and representative of authentication mark $am_1$ of authentic article 10. Step (c) is performed by using central programming and control/data/information signal processing unit (CPPU) 24 of spectral imaging and analysis system 14, and the data is stored in a intra-authentication mark physicochemical region group database.

The identification procedure involves analyzing the plurality of acquired spectral images for those particular spectral images which only 'slightly' differ by relatively small shifts in the value of the emitted energy, E($am_1$), 20, and/or, only 'slightly' differ by relatively small shifts in the value of the intensity or amplitude, A($am_1$), of emitted energy, E($am_1$), 20, detected by detected by optical energy detector unit 22 of spectral imaging and analysis system 14. Preferably, the identification procedure involves analyzing the plurality of spectral images for those particular spectral images which only slightly differ by relatively small shifts in the value of the emitted energy, E($am_1$), 20, in terms of a shift in wavelength, frequency, or, wavenumber, of fluorescent or phosphorescent light emitted by a the imaged part of authentication mark $am_1$ and detected by spectral imaging and analysis system 14.

Specifically, there is identifying at least one spectral shift, $s_i$, in each set of single-authentication mark spectral fingerprint data, F($am_1$), associated with the imaged part of authentication mark $am_1$, for forming an intra-authentication mark physicochemical region group, herein, referred to as PC-RG ($am_1$), featuring a plurality of sub-sets of intra-authentication mark spectral fingerprint pattern data, herein, referred to as FP($am_1$, PC-$R_j$), where the value of at least one selected data element, for example, emitted energy, E($am_1$), 20, and/or, intensity or amplitude, A($am_1$), of emitted energy, E($am_1$), 20, in each sub-set of intra-authentication mark spectral fingerprint pattern data, FP($am_1$, PC-$R_j$), is shifted relative to the value of each corresponding data element in each remaining sub-set of intra-authentication mark spectral fingerprint pattern data, FP($am_1$, PC-$R_k$), for k not equal to j, in the same intra-authentication mark physicochemical region group, PC-RG($am_1$).

Each sub-set of intra-authentication mark spectral fingerprint pattern data, FP($am_1$, PC-$R_j$), is characterized by an intra-authentication mark spectral fingerprint pattern spectrum, S($am_1$, PC-$R_j$), featuring intensity or amplitude, A($am_1$, PC-$R_j$) of emitted energy, E($am_1$, PC-$R_j$), 20, plotted as a function of emitted energy, E($am_1$, PC-$R_j$), 20, detected during imaging authentication mark $am_1$ by spectral imaging and analysis system 14.

PC-$R_j$, for j=1 to J, and PC-$R_k$, for k not equal to j, different sub-sets of intra-authentication mark spectral fingerprint pattern data in the intra-authentication mark physicochemical region group, PC-RG($am_1$), are intra-authentication mark physicochemical region group sub-set identifiers, used for distinguishing among the plurality of sub-sets of intra-authentication mark spectral fingerprint pattern data, FP($am_1$, PC-$R_j$), and FP($am_1$, PC-$R_k$), associated with the same set of single-authentication mark spectral fingerprint data, F($am_1$). This classification enables performing next Step (d) of forming a set of intra-authentication mark physicochemical properties and characteristics data from the intra-authentication mark physicochemical region group, PC-RG($am_1$), featuring the plurality of sub-sets of intra-authentication mark spectral fingerprint pattern data, FP($am_1$, PC-$R_j$).

Existence of at least one spectral shift, $s_i$, in a given set of single-authentication mark spectral fingerprint data, F($am_1$), associated with the imaged part of authentication mark $am_1$, is due to the local, intra-authentication mark, variation, heterogeneity, or is fluctuation, of physicochemical properties and characteristics of the materials or substances of authentication mark $am_1$ (for example, in the case of printed paper currency, the physicochemical properties and characteristics of the ink, dye, micro-sized non-metallic or metallic fibers, threads, or ribbons, and, the physicochemical properties and characteristics of the paper substrate thereof), in the imaged part of authentication mark $am_1$.

This intra-authentication mark variation, heterogeneity, or fluctuation, of physicochemical properties and characteristics of the physicochemical properties and characteristics of the materials or substances of the imaged part of authentication mark $am_1$, corresponds to a plurality of at least two different physicochemical region types, each associated with different physicochemical properties and characteristics data, in the intra-authentication mark physicochemical region group, PC-RG($am_1$), of the imaged part of authentication mark $am_1$. This variable or heterogeneous physicochemical phenomenon corresponds to focused incident electromagnetic radiation 18, which is transmitted and incident upon the selected part of authentication mark $am_1$ of authentic article 10 (FIG. 1), being affected slightly differently by each intra-authentication mark physicochemical region type, of the imaged part of authentication mark $am_1$ of authentic article 10, whereby spectral imaging and analysis system 14 is used for accurately and reproducibly detecting and analyzing this phenomenon, for the purpose of highly accurately and unambiguously authenticating authentic article 10.

Figure 2:
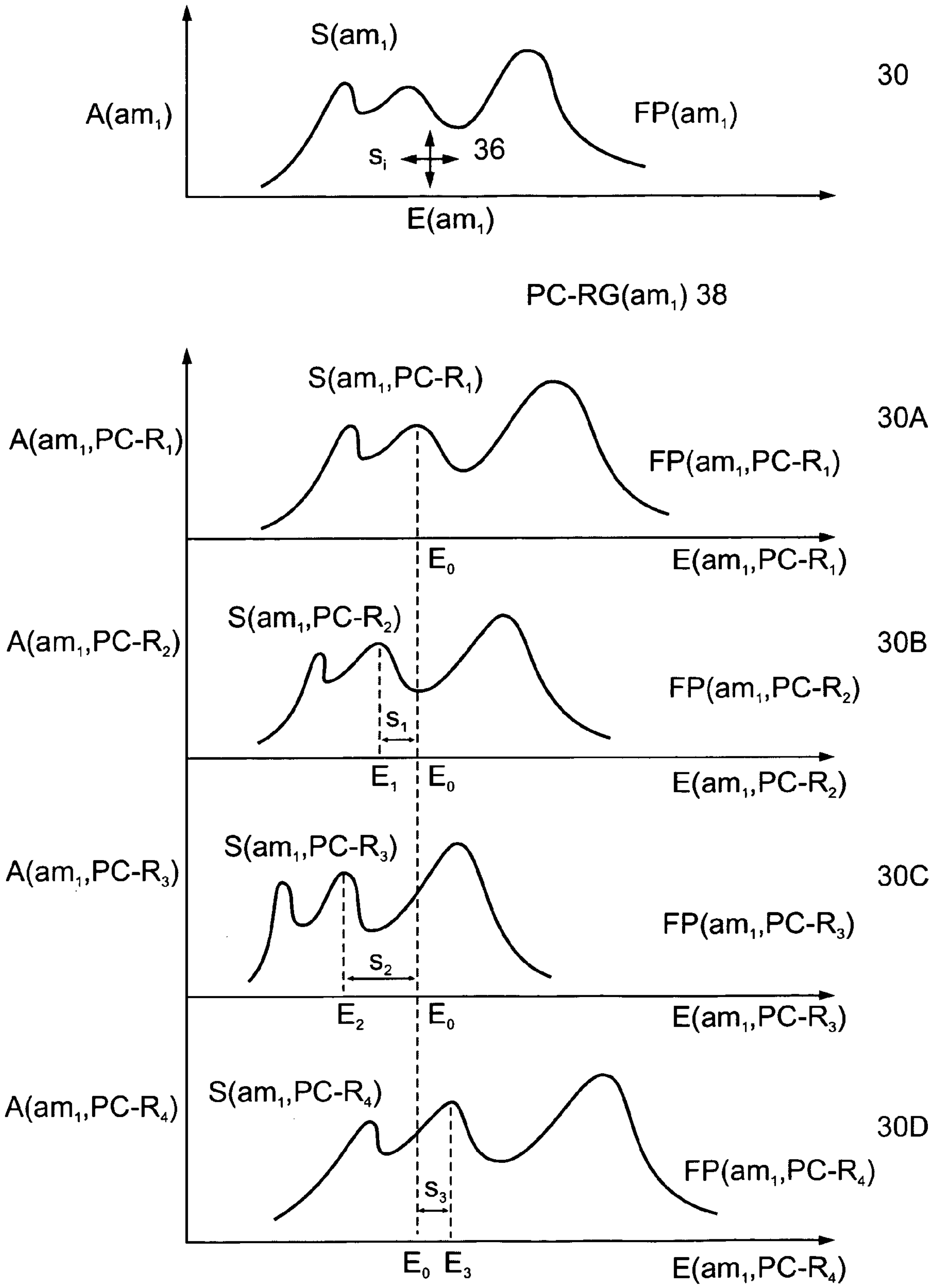
FIG. 2 is a schematic diagram illustrating the step of identifying spectral shifts in intra-authentication mark spectral imaging data representative of an exemplary authentication mark, $am_1$, of the authentic article of FIG. 1, in accordance with the present invention.

The above described process of identifying spectral shifts is clearly illustrated in FIG. 2, a schematic diagram illustrating the step of identifying spectral shifts in intra-authentication mark spectral imaging data representative of exemplary authentication mark $am_1$ of authentic article 10. For example, in the set of single-authentication mark spectral fingerprint data, $F(am_1)$, of the imaged part of authentication mark $am_1$, characterized by single-authentication mark spectral fingerprint spectrum, $S(am_1)$, 30, shown in FIG. 1, there is identifying at least one spectral shift, $s_i$, in the value of at least one selected data element, for example, emitted energy, $E(am_1, PC\text{-}R_j)$, 20, and/or, intensity or amplitude, $A(am_1, PC\text{-}R_j)$ of emitted energy, $E(am_1, PC\text{-}R_j)$, 20, where such potentially identified spectral shift(s), $s_i$, are referenced in FIG. 2 by the four directional crossed arrows 36, for forming intra-authentication mark physicochemical region group, $PC\text{-}RG(am_1)$ 38.

In this illustrative example, for the imaged part of authentication mark $am_1$, intra-authentication mark physicochemical region group, $PC\text{-}RG(am_1)$ 38 features four sub-sets of intra-authentication mark spectral fingerprint pattern data, $FP(am_1, PC\text{-}R_1)$, $FP(am_1, PC\text{-}R_2)$, $FP(am_1, PC\text{-}R_3)$, and $FP(am_1, PC\text{-}R_4)$, where each sub-set, $FP(am_1, PC\text{-}R_j)$, is characterized by a corresponding intra-authentication mark spectral fingerprint pattern spectrum, $S(am_1, PC\text{-}R_1)$, $S(am_1, PC\text{-}R_2)$, $S(am_1, PC\text{-}R_3)$, and $S(am_1, PC\text{-}R_4)$, respectively, featuring intensity or amplitude, $A(am_1, PC\text{-}R_1)$, $A(am_1, PC\text{-}R_2)$, $A(am_1, PC\text{-}R_3)$, and $A(am_1, PC\text{-}R_4)$, of emitted energy 20, $E(am_1, PC\text{-}R_1)$, $E(am_1, PC\text{-}R_2)$, $E(am_1, PC\text{-}R_3)$, and $E(am_1, PC\text{-}R_4)$, respectively, plotted as a function of emitted energy 20, $E(am_1, PC\text{-}R_1)$, $E(am_1, PC\text{-}R_2)$, $E(am_1, PC\text{-}R_3)$, and $E(am_1, PC\text{-}R_4)$, respectively, referenced by 30A, 30B, 30C, and 30D, respectively.

In FIG. 2, three spectral shifts, $s_1$, $s_2$, and $s_3$, are shown identified, whereby the value of at least one selected data element, for example, emitted energy, $E(am_1, PC\text{-}R_j)$, 20, in each sub-set of intra-authentication mark spectral fingerprint pattern data, $FP(am_1, PC\text{-}R_j)$, is shifted relative to the value of each corresponding data element, $E(am_1, PC\text{-}R_k)$, in each remaining sub-set of intra-authentication mark spectral fingerprint pattern data, $FP(am_1, PC\text{-}R_k)$, for k not equal to j, in the same intra-authentication mark physicochemical region group, $PC\text{-}RG(am_1)$ 38. In this particular illustrative example, the first sub-set of intra-authentication mark spectral fingerprint pattern data, $FP(am_1, PC\text{-}R_1)$, characterized by the corresponding intra-authentication mark spectral fingerprint pattern spectrum, $S(am_1, PC\text{-}R_1)$, referenced by 30A, is shown as a baseline used for identifying and illustrating the three spectral shift $s_1$, $s_2$, and $s_3$, in the value of at least one selected data element, in this case, $E(am_1, PC\text{-}R_1)$, from the value of each corresponding data element, in this case, $E(am_1, PC\text{-}R_2)$, $E(am_1, PC\text{-}R_3)$, and $E(am_1, PC\text{-}R_4)$, respectively, in the three remaining sub-sets of intra-authentication mark spectral fingerprint pattern data, $FP(am_1, PC\text{-}R_2)$, $FP(am_1, PC\text{-}R_3)$, and $FP(am_1, PC\text{-}R_4)$, respectively, where each remaining sub-set is characterized by the corresponding intra-authentication mark spectral fingerprint pattern spectrum, $S(am_1, PC\text{-}R_2)$, $S(am_1, PC\text{-}R_3)$, and $S(am_1, PC\text{-}R_4)$, respectively, referenced by 30B, 30C, and 30D, respectively.

Specifically, as shown in FIG. 2, spectral shift, $s_1$, corresponds to a shift in the value of the emitted energy data element, $E(am_1, PC\text{-}R_j)$, from the baseline value of emitted energy data element, $E_0(am_1, PC\text{-}R_1)$, in the first sub-set of intra-authentication mark spectral fingerprint pattern data, $FP(am_1, PC\text{-}R_1)$, characterized by the first intra-authentication mark spectral fingerprint pattern spectrum, $S(am_1, PC\text{-}R_1)$, 30A, to a shifted lower value of emitted energy data element, $E_1(am_1, PC\text{-}R_2)$, in the second sub-set of intra-authentication mark spectral fingerprint pattern data, $FP(am_1, PC\text{-}R_2)$, characterized by the second intra-authentication mark spectral fingerprint pattern spectrum, $S(am_1, PC\text{-}R_2)$, 30B. As shown in FIG. 2, the value of emitted energy $E_1$ is less than the baseline value of emitted energy $E_0$.

Spectral shift, $s_2$, corresponds to a shift in the value of the emitted energy data element, $E(am_1, PC\text{-}R_j)$, from the baseline value of emitted energy data element, $E_0(am_1, PC\text{-}R_1)$, in the first sub-set of intra-authentication mark spectral fingerprint pattern data, $FP(am_1, PC\text{-}R_1)$, characterized by the first intra-authentication mark spectral fingerprint pattern spectrum, $S(am_1, PC\text{-}R_1)$, 30A, to a shifted lower value of emitted energy data element, $E_2(am_1, PC\text{-}R_3)$, in the third sub-set of intra-authentication mark spectral fingerprint pattern data, $FP(am_1, PC\text{-}R_3)$, characterized by the third intra-authentication mark spectral fingerprint pattern spectrum, $S(am_1, PC\text{-}R_3)$, 30C. As shown in FIG. 2, the value of emitted energy $E_2$ is less than the value of emitted energy $E_1$.

Spectral shift, $s_3$, corresponds to a shift in the value of the emitted energy data element, $E(am_1, PC\text{-}R_j)$, from the baseline value of emitted energy data element, $E_0(am_1, PC\text{-}R_1)$, in the first sub-set of intra-authentication mark spectral fingerprint pattern data, $FP(am_1, PC\text{-}R_1)$, characterized by the first intra-authentication mark spectral fingerprint pattern spectrum, $S(am_1, PC\text{-}R_1)$, 30A, to a shifted higher value of emitted energy data element, $E_3(am_1, PC\text{-}R_4)$, in the fourth sub-set of intra-authentication mark spectral fingerprint pattern data, $FP(am_1, PC\text{-}R_4)$, characterized by the fourth intra-authentication mark spectral fingerprint pattern spectrum, $S(am_1, PC\text{-}R_4)$, 30D. As shown in FIG. 2, the value of emitted energy $E_3$ is greater than the baseline value of emitted energy $E_0$, greater than the value of emitted energy $E_1$, and greater than the value of emitted energy $E_2$.

In Step (d), there is forming a set of intra-authentication mark physicochemical properties and characteristics data relating to the imaged authentication mark, by performing pattern recognition and classification analysis on the intra-authentication mark physicochemical region group of the imaged authentication mark.

This step is performed for forming a set of intra-authentication mark physicochemical properties and characteristics data relating to and representative of the imaged part of authentication mark $am_1$ of authentic article 10. Step (d) is performed by using central programming and control/data/information signal processing unit (CPPU) 24 of spectral imaging and analysis system 14, and the data is stored in an intra-authentication mark physicochemical properties and characteristics data database.

The imaged part of authentication mark $am_1$ of authentic article 10, being spectrally imaged and analyzed for exhibiting spectral shifts, $s_i$, exhibits intra-authentication mark variation, heterogeneity, or fluctuation, of physicochemical properties and characteristics of the ink, and/or, of physicochemical properties and characteristics of the substrate of the ink, such that there exists a corresponding plurality of at least two different physicochemical region types, each associated with different physicochemical properties and characteristics data, in the intra-authentication mark physicochemical region group, $PC\text{-}RG(am_1)$, of the imaged part of authentication mark $am_1$. Accordingly, the plurality of sub-sets of intra-authentication mark spectral fingerprint pattern data, $FP(am_1, PC\text{-}R_j)$, are used for forming the intra-authentication mark physicochemical region group, $PC\text{-}RG(am_1)$ 38, as described in preceding Step (c). In Step (d), for the imaged part of authentication mark $am_1$ of authentic article 10, the plurality of sub-sets of intra-authentication mark spectral fingerprint pattern data, $FP(am_1, PC\text{-}R_j)$, featured in the intra-authentication mark physicochemical region group, $PC\text{-}RG(am_1)$ 38, are correlated with a corresponding plurality of intra-authentication mark physicochemical region types, PC-$R_j$, for j=1 to J different types of intra-authentication mark physicochemical regions identified in, or assigned to, the imaged part of authentication mark $am_1$, by performing pattern recognition and classification analysis.

Intra-authentication mark physicochemical region type, PC-$R_j$, corresponds to the intra-authentication mark physicochemical region group sub-set identifier, PC-$R_j$, used in Step (c) for distinguishing among the plurality of sub-sets of intra-authentication mark spectral fingerprint pattern data, FP($am_1$, PC-$R_j$), associated with the same set of single-authentication mark spectral fingerprint data, F($am_1$), as shown in FIG. 2.

Each intra-authentication mark physicochemical region type, PC-$R_j$, is associated with a different set of physicochemical properties and characteristics data, herein, referred to as PPCD, of the imaged part of authentication mark $am_1$. Values in the PPCD set vary throughout the imaged part of authentication mark $am_1$, in accordance with variation of the associated intra-authentication mark physicochemical region type, PC-$R_j$. Due to the local, intra-authentication mark, variation, heterogeneity, or fluctuation of physicochemical properties and characteristics of the materials or substances located in the imaged part of authentication mark $am_1$, the focused incident electromagnetic radiation 18, which is transmitted and incident upon the selected part of authentication mark $am_1$ of authentic article 10 (FIG. 1), is affected slightly differently by each intra-authentication mark physicochemical region type, of the imaged part of authentication mark $am_1$ of authentic article 10.

This intra-authentication mark physicochemical phenomenon existing during imaging part of authentication mark $am_1$ of authentic article 10, enables forming intra-authentication mark physicochemical region group, PC-RG($am_1$) 38, in Step (c), featuring the plurality of sub-sets of intra-authentication mark spectral fingerprint pattern data, FP($am_1$, PC-$R_j$), where the value of at least one selected data element in each sub-set, FP($am_1$, PC-$R_j$), is shifted relative to the value of each corresponding data element in each remaining sub-set, FP($am_1$, PC-$R_k$), for k not equal to j, in the same intra-authentication mark physicochemical region group, PC-RG($am_1$) 38, as illustratively exemplified in FIG. 2 for the imaged part of authentication mark $am_1$.

Accordingly, in Step (d), for the imaged part of authentication mark $am_1$, there is forming a set of intra-authentication mark physicochemical properties and characteristics data, herein, referred to as PPCD[$am_1$: PC-$R_j$ ($ppcd_j$)], for j=1 to J different intra-authentication mark physicochemical region types, PC-$R_j$, of the imaged part of authentication mark $am_1$ of authentic article 10, by performing pattern recognition and classification analysis on the intra-authentication mark physicochemical region group, PC-RG($am_1$) 38, of the imaged part of authentication mark $am_1$, featuring the plurality of sub-sets of intra-authentication mark spectral fingerprint pattern data, FP($am_1$, PC-$R_j$), exhibiting spectral shifts, $s_i$, associated with the same set of single-authentication mark spectral fingerprint data, F($am_1$).

For example, with reference to FIG. 2, for the imaged part of authentication mark $am_1$ of authentic article 10 featuring variation, heterogeneity, or fluctuation, of physicochemical properties and characteristics of the materials or substances located in the imaged part of authentication mark $am_1$, the plurality of four sub-sets of intra-authentication mark spectral fingerprint pattern data, FP($am_1$, PC-$R_1$), FP($am_1$, PC-$R_2$), FP($am_1$, PC-$R_3$), and FP($am_1$, PC-$R_4$), where each sub-set, FP($am_1$, PC-$R_j$), is characterized by the corresponding intra-authentication mark spectral fingerprint pattern spectrum, S($am_1$, PC-$R_1$) 30A, S($am_1$, PC-$R_2$) 30B, S($am_1$, PC-$R_3$) 30C, and S($am_1$, PC-$R_4$) 30D, respectively, exhibiting spectral shifts, $s_1$, $s_2$, and $s_3$, in emitted energy 20, E($am_1$, PC-$R_j$), used for forming the intra-authentication mark physicochemical region group, PC-RG($am_1$) 38, in accordance with preceding Step (c), are correlated with the four corresponding different intra-authentication mark physicochemical region types, PC-$R_1$, PC-$R_2$, PC-$R_3$, and PC-$R_4$, respectively, of the imaged part of authentication mark $am_1$ of authentic article 10. Optionally, a fifth sub-set of intra-authentication mark spectral fingerprint pattern data, FP($am_1$, PC-$R_5$), is included in the intra-authentication mark physicochemical region group, PC-RG($am_1$) 38, for correlating line or edge effects present in the imaged part of authentication mark $am_1$ detected during the spectral imaging of authentication mark $am_1$ of authentic article 10.

Accordingly, for the imaged part of authentication mark $am_1$, featuring, for example, five different intra-authentication mark physicochemical region types, PC-$R_j$, for j=1 to 5, the set of intra-authentication mark physicochemical properties and characteristics data is written as: PPCD[$am_1$: PC-$R_j$ ($ppcd_j$)], for j=1 to 5, and the complete set of intra-authentication mark physicochemical properties and characteristics data becomes: PPCD[$am_1$: PC-$R_1$ ($ppcd_1$); PC-$R_2$ ($ppcd_2$); PC-$R_3$ ($ppcd_3$); PC-$R_4$ ($ppcd_4$); PC-$R_5$ ($ppcd_5$)], as referenced by 40 in the upper part of FIG. 3. The complete set of intra-authentication mark physicochemical properties and characteristics data can be used for generating an exemplary intra-authentication mark physicochemical properties and characteristics data map, PPCD Map [$am_1$] 42, of the imaged part of authentication mark $am_1$, as illustrated in the bottom part of FIG. 3.

Pattern recognition and classification in Step (d) of the present invention can be performed by using any number of a variety of known methods. Preferably, Step (d) of the present invention is performed by using the same methodology of pattern recognition and classification described in the same applicant disclosures of U.S. Pat. No. 6,438,261, U.S. Pat. No. 6,091,843, and U.S. Pat. No. 5,880,830, the teachings of each of which are incorporated by reference for all purposes as if fully set forth herein.

For performing the pattern recognition and classification analysis, there is applying one or more image analysis algorithms, such as detection, pattern recognition and classification, and/or decision image analysis algorithms, to the intra-authentication mark physicochemical region group, PC-RG ($am_1$) 38, of the imaged part of authentication mark $am_1$, featuring a plurality of sub-sets of intra-authentication mark spectral fingerprint pattern data, FP($am_1$, PC-$R_j$), exhibiting spectral shifts, $s_i$, associated with the same set of single-authentication mark spectral fingerprint data, F($am_1$).

The plurality of sub-sets of intra-authentication mark spectral fingerprint pattern data, FP($am_1$, PC-$R_j$), are analyzed by relating and correlating intra-authentication mark spectral information and parameters of (i) pixel intensity, (ii) signal-to-noise ratio (S/N), (iii) image sharpness, (iv) spectral distances (in particular, distances between pre-determined individual neighboring pixels and/or between predetermined groups of neighboring pixels), and, (v) spectral fingerprints (pattern of peaks, troughs, and shifts, in the curves of authentication mark emission spectra) associated with distinct spectral emission patterns of the imaged part of authentication mark $am_1$, that is, spectral fingerprints in the corresponding plurality of intra-authentication mark spectral fingerprint pattern spectrums, S($am_1$, PC-$R_j$) for example, as illustrated in FIG. 2, to empirically determined intra-authentication mark physicochemical property and characteristics relating to the variation, heterogeneity, or fluctuation, of (i) physicochemical properties and characteristics of, for example, the ink or dye, and/or, of (ii) physicochemical properties and characteristics of the substrate of the ink or dye, of the imaged part of authentication mark $am_1$.

Calibration data of standard samples of authentic article 12 with known, or unknown, but measurable, intra-authentication mark physicochemical property and characteristics, are used as part of the pattern recognition and classification image analysis. This includes performing pattern recognition and classification with respect to intra-authentication mark physicochemical region groups, PC-RG($am_1$) 38, of the imaged part of authentication mark $am_1$, each having a plurality of different intra-authentication mark physicochemical region types, PC-$R_j$.

Step (d) includes relating the plurality of sub-sets of intra-authentication mark spectral fingerprint pattern data, FP($am_1$, PC-$R_j$), exhibiting spectral shifts, $s_i$, associated with the same set of single-authentication mark spectral fingerprint data, F($am_1$) in the intra-authentication mark physicochemical region group, PC-RG($am_1$) 38, of the imaged part of authentication mark $am_1$, of authentic article 10, to empirically determined sub-sets of intra-authentication mark spectral fingerprint pattern data, FP($am_j$, PC-$R_j$), exhibiting spectral shifts, $s_i$, associated with the same set of single-authentication mark spectral fingerprint data, F($am_1$) in the intra-authentication mark physicochemical region group, PC-RG($am_1$) 38, of the imaged part of authentication mark $am_1$, of authentic article 10. The empirically determined sub-sets of intra-authentication mark spectral fingerprint pattern data, FP($am_1$, PC-$R_j$), are obtained and stored from spectral imaging a statistically meaningful representative calibration or standard reference sample of authentic article 10 having authentication mark $am_1$, featuring known variation, heterogeneity, or fluctuation, of physicochemical properties and characteristics of the ink, and/or, of physicochemical properties and characteristics of the substrate of the ink, of the authentication mark $am_1$.

Examples of specific detection, pattern recognition and classification, and/or decision algorithms suitable for image analysis in the method of the present invention are fully described in previously cited U.S. Pat. Nos. 6,438,261; 6,091,843; and 5,880,830, and references cited therein, which are incorporated by reference for all purposes as if fully set forth herein. For example, as described by Kettig, R. L. and Landgrebe, D., in "Classification Of Multispectral Image Data By Extraction And Classification Of Homogeneous Objects", *IEEE Transactions on Geoscience Electronics*, Vol. GE14 p. 19 (1976). Alternatively, neural networks are trained, for example, as described by Yu, P., Anastassopoulos, V., and Venetsanopoulos, A. N., "Pattern Classification And Recognition Based On Morphology And Neural Networks", *Can. J Elect. and Comp. Eng.*, Vol. 17 No. 2 (1992) pp. 58-59 and references cited therein, using the calibration spectral descriptor vectors and spectral types, and, the calibration physicochemical descriptor vectors and physicochemical types, as neural training sets. The desired relationships between the calibration spectral descriptor vectors and types, and, the calibration physicochemical descriptor vectors and types, are used as trained neural networks, applicable to the plurality of sub-sets of intra-authentication mark spectral fingerprint pattern data, FP($am_1$, PC-$R_j$), exhibiting spectral shifts, $s_i$, associated with the same set of single-authentication mark spectral fingerprint data, F($am_1$) in the intra-authentication mark physicochemical region group, PC-RG($am_1$) 38, of the imaged part of authentication mark $am_1$ of authentic article 10.

In Step (e), there is comparing and matching values of elements in the set of intra-authentication mark physicochemical properties and characteristics data relating to the imaged authentication mark to values of corresponding reference elements in a reference set of intra-authentication mark physicochemical properties and characteristics data of the authentic article, thereby authenticating the authentic article.

This step is performed for generating highly accurate and unambiguous results of authentication of authentic article 10. Step (e) is performed by using, and the result is stored in, central programming and control/data/information signal processing unit (CPPU) 24 of spectral imaging and analysis system 14. Optionally, the authentication results generated by central programming and control/data/information signal processing unit (CPPU) 24 are displayed and/or indicated on display unit 26, operatively connected to central programming and control/data/information signal processing unit (CPPU) 24, as shown in FIG. 1.

Figure 3:
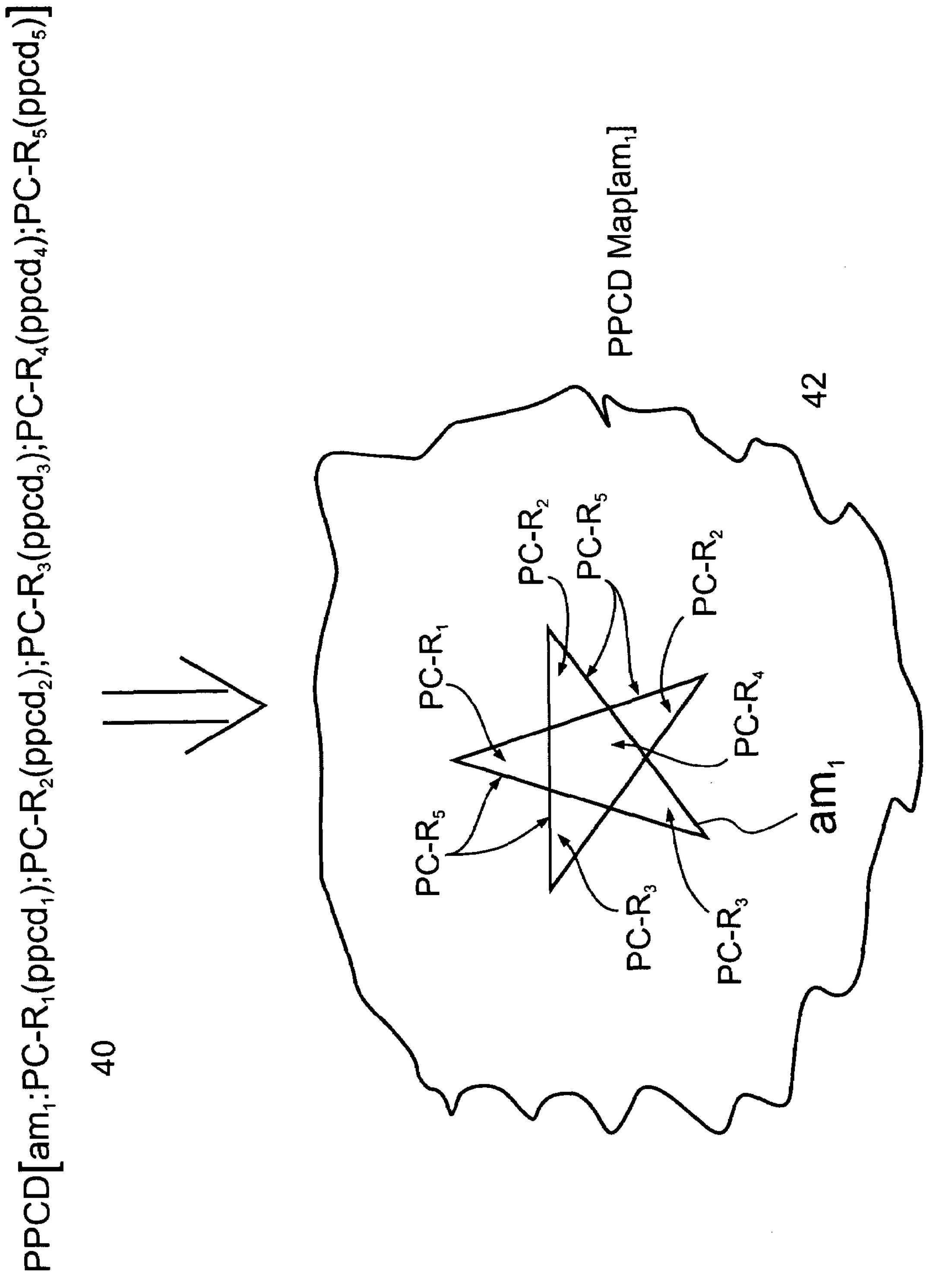
FIG. 3 is a schematic diagram illustrating an exemplary intra-authentication mark physicochemical properties and characteristics data map, PPCD Map[$am_1$], of the exemplary imaged part of authentication mark $am_1$ of the authentic article of FIG. 1, generated from the exemplary set of the intra-authentication mark physicochemical properties and characteristics data, PPCD[$am_1$: PC-$R_j$ ($ppcd_j$)], formed from the spectral imaging data of FIG. 2, in accordance with the present invention.

In this step, there is comparing and matching values of the elements, PC-$R_j$($ppcd_j$), for j=1 to5, being PC-$R_1$($ppcd_1$), PC-$R_2$($ppcd_2$), PC-$R_3$($ppcd_3$), PC-$R_4$($ppcd_4$), and PC-$R_5$($ppcd_5$), in the complete set of intra-authentication mark physicochemical properties and characteristics data, PPCD [$am_1$:PC-$R_j$($ppcd_j$) ], as referenced by 40 in the upper part of FIG. 3, relating to and representative of the imaged part of authentication mark $am_1$ of authentic article 12, to values of the corresponding reference ($^R$) elements, PC-$R_j$ $(ppcd_j)^R$, for j =1to5, being PC-$R_1$$(ppcd_1)^R$, PC-$R_2$$(ppcd_2)^R$, PC-$R_3$ $(ppcd_3)^R$, PC-$R_4$$(ppcd_4)^R$, PC- $R_5$$(ppcd_5)^R$, in the complete reference set of intra-authentication mark physicochemical properties and characteristics data, $PPCD^R$[$am_1$:PC-$R_j$ $(ppcd_j)^R$], of the corresponding imaged part of a reference authentication mark $am_1{}^R$, of authentic article 10. For authentication of an authentic article, such as authentic article 10 according to an established 'authentication' criterion or specification, for example, based on having a pre-determined minimum number of 'matched' values of the data elements during and/or following the comparison of the two sets of intra-authentication mark physicochemical properties and characteristics data, Step (e) generates a highly accurate and unambiguous result of authentication of authentic article 10.

In the event that a 'non-authentic' article having a non-authentic (fake or counterfeit) authentication mark is subjected to the method of the present invention, the authentication method will provide an unambiguous and accurate mismatch between values of elements in the set of intra-authentication mark physicochemical properties and characteristics data relating to the imaged 'non-authentic' authentication mark and corresponding values of reference elements in a reference set of intra-authentication mark physicochemical properties and characteristics data of the authentic article, thereby unambiguously determining the non-authenticity of the non-authentic article.

Thus, based on, in addition to, or a consequence of, the above described aspects of novelty and inventiveness, the present invention as illustratively described and exemplified hereinabove, has several beneficial and advantageous features and characteristics.

The present invention is highly accurate (typically, on the order of ppm (parts per million) level of accuracy per authenticated article) and is highly precise. By implementing the present invention, there is unambiguously authenticating an authentic article having at least one authentication mark, in a highly accurate and reproducible manner. In the event that an 'unauthentic' article having an unauthentic (fake or counterfeit) authentication mark is subjected to the method of the present invention, the method will provide an unambiguous and accurate mismatch between values of elements in the set of intra-authentication mark physicochemical properties and characteristics data relating to the imaged 'unauthentic' authentication mark and corresponding values of reference elements in a reference set of intra-authentication mark physicochemical properties and characteristics data of the authentic article, thereby unambiguously determining the non-authenticity of an unauthentic article.

The present invention is applicable for 'multi-level' authenticating an authentic article having an authentication mark including a first level of 'overt' features and characteristics which are visually recognizable, detectable, and authenticatable, by a human, and verifiable by using the present invention, and a second level of 'covert' features and characteristics which are visually recognizable, detectable, and authenticatable, by only implementing the authentication method of the method of the present invention.

The present invention is generally applicable to a wide variety of different types of authentic articles and is generally applicable to a wide variety of different types of authentication marks. The article authentication method of the present invention is generally applicable to essentially any type of authentic article having at least one authentication mark which exhibits spectrally based characteristics, behavior, and phenomena, that can be detected, recorded, and analyzed, using spectroscopic (spectral) techniques involving automatic pattern recognition (APR) or/and optical character recognition (OCR) types of imaging analysis, for authenticating the authentic article. The article authentication method of the present invention is particularly applicable to essentially any type of printed authentic article including essentially any type(s) of authentication mark(s) having any particulate or/and non-particulate type of two-dimensional or/and three-dimensional topological, morphological, and geometrical, configuration, shape, or form, and being composed of essentially any number and type(s) of chemical, physical, biochemical, molecular biological, or/and biological, material(s) or substance(s). In a complementary empirically deductive manner, the article authentication method of the present invention is generally applicable for determining non-authenticity of non-authentic (fake or counterfeit) articles.

The present invention is commercially applicable and is well suitable for real time applications and situations involving the need for quickly authenticating an authentic article. This aspect is especially important for business, commercial, and official governmental agency, applications, involving persons and institutions handling, processing, and authenticating, large volumes of authentic articles on a day to day basis, during which the total time required for authenticating such large volumes should be minimized in order to preserve the capability of performing day to day business, commerce, and government work, in a quick and efficient manner.

The present invention can be implemented as part of a global international secure authentication network. For example, in the case of paper currency, the present invention can be implemented at each of a large number of local or/and regional banks for authenticating paper currency during bank to consumer transactions and/or bank to bank transactions, respectively, taking place in a single country or in different countries, and can additionally be implemented at each of a number of international banks and/or government entities for authenticating large amounts of the paper currency used in international transactions. Any number of the local, regional, and international, banks and/or institutions can be linked into a single secure authentication network.

The present invention can be implemented for providing sophisticated, accurate, and precise, traceability to authentic articles, as well as to unauthentic (fake or counterfeit) articles, involving tracking or tracing paths of circulation (procurement, distribution, and/or use), including sources and destinations, of authentic articles, and/or of unauthentic articles. This aspect of the present invention is especially useful to the field of international law enforcement, involved with forensics and other legal matters pertaining to illegal procurement, distribution, and/or use, of authentic articles and/or unauthentic articles. Relatedly, the present invention can be applied for detecting, analyzing, and classifying, authentic articles, and/or unauthentic articles, which have authentication marks that feature unknown physicochemical properties and characteristics.

It is appreciated that certain aspects and characteristics of the invention, which are, for clarity, described in the context of separate embodiments, may also be provided in combination in a single embodiment. Conversely, various aspects and characteristics of the invention, which are, for brevity, described in the context of a single embodiment, may also be provided separately or in any suitable sub-combination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for authenticating an authentic article having an authentication mark, comprising the steps of:

(a) acquiring a set of hyper-spectral images of at least a part of the authentication mark, by using a spectral imaging and analysis system operative according to a hyper-spectral mode of spectral imaging and analysis, said system includes a central programming and control/data/information signal processing unit for acquiring, processing and analyzing, generating, and database storing of, hyper-spectral imaging data and information, said set of hyper-spectral images is stored in a single-authentication mark spectral image data-base of said central programming and signal processing unit;

(b) forming a set of single-authentication mark hyper-spectral fingerprint data from said set of acquired hyper-spectral images of said hyper-spectrally imaged authentication mark, by using said central programming and signal processing unit, and storing said set of single-authentication mark spectral fingerprint data in a single-authentication mark spectral fingerprint database of said central programming and signal processing unit;

(c) identifying at least one spectral shift in said set of single-authentication mark hyper-spectral fingerprint data associated with said hyper-spectrally imaged authentication mark, for forming an intra-authentication mark physicochemical region group including a plurality of sub-sets of intra-authentication mark hyper-spectral fingerprint pattern data, such that value of at least one selected data element in each said sub-set is shifted relative to value of each corresponding said data element in each remaining said sub-set in same said intra-authentication mark physicochemical region group, by using said central programming and signal processing unit, and storing said intra-authentication mark physicochemical region group data in a intra-authentication mark physicochemical region group database of said central programming and signal processing unit;

(d) forming a set of intra-authentication mark physicochemical properties and characteristics data relating to said hyper-spectrally imaged authentication mark, by performing pattern recognition and classification analysis on said intra-authentication mark physicochemical region group of said hyper-spectrally imaged authentication mark, by using said central programming and signal processing unit, and storing said set of intra-authentication mark physicochemical properties and characteristics data in an intra-authentication mark physicochemical properties and characteristics data database of said central programming and signal processing unit; and (e) comparing and matching values of elements in said set of intra-authentication mark physicochemical properties and characteristics data relating to said hyper-spectrally imaged authentication mark to values of corresponding reference elements in a reference set of intra-authentication mark physicochemical properties and characteristics data of the authentic article, thereby authenticating the authentic article, by using, and storing results thereof in, said central programming and signal processing unit.

2. The method of claim 1, wherein step (a), the authentic article is positioned upon a support device or mechanism which statically supports and holds the authentic article while the authentic article is hyper-spectrally imaged.

3. The method of claim 1, wherein step (a), the authentic article is positioned upon a support device or mechanism which dynamically supports, holds, and transports, the authentic article while the authentic article is hyper-spectrally imaged.

4. The method of claim 1, wherein said spectral imaging and analysis system is operative according to an off-line stationary mode, such that throughput time for performing entire process of said spectral imaging and analysis of the authentic article is in a range of between about 10 seconds and about 60 seconds.

5. The method of claim 1, wherein said spectral imaging and analysis system is operative according to a high speed discontinuous (staggered) mode, such that throughput time for performing entire process of said spectral imaging and analysis of the authentic article is in a range of between about 100 milliseconds and about 60 seconds.

6. The method of claim 1, wherein said spectral imaging and analysis system is operative according to a high or ultra-high speed continuous mode, such that throughput time for performing entire process of said spectral imaging and analysis of the authentic article is in a range of between about 10 milliseconds and about 100 milliseconds.

7. The method of claim 6, wherein said continuous mode is performed by continuously scanning individual lines of the authentic article.

8. The method of claim 1, wherein step (a), said spectral imaging and analysis system includes a plurality of two or more separately operable or multiplexed individual illumination energy source and optical units, for transmitting incident electromagnetic radiation of different individual wavelengths upon said part of the authentication mark.

9. The method of claim 1, wherein step (c) involves analyzing said set of acquired hyper-spectral images for particular hyper-spectral images, such that said value of at least one selected data element in each said sub-set is shifted on order of about parts per thousand level relative to said value of each corresponding said data element in each said remaining sub-set in same said intra-authentication mark physicochemical region group.

10. The method of claim 1, wherein step (c), different said sub-sets of intra-authentication mark spectral fingerprint pattern data in said intra-authentication mark physicochemical region group are intra-authentication mark physicochemical region group sub-set identifiers, used for distinguishing among said plurality of said sub-sets of intra-authentication mark spectral fingerprint pattern data associated with same said set of single-authentication mark spectral fingerprint data.

11. The method of claim 1, wherein step (c), said at least one selected data element is emitted energy emitted by said hyper-spectrally imaged authentication mark, or, intensity or amplitude of said emitted energy.

12. The method of claim 1, wherein step (c), said at least one selected data element is emitted energy emitted by said hyper-spectrally imaged authentication mark, and, intensity or amplitude of said emitted energy.

13. The method of claim 1, wherein step (d), said plurality of sub-sets of intra-authentication mark hyper-spectral fingerprint pattern data featured in said intra-authentication mark physicochemical region group are correlated with a corresponding plurality of intra-authentication mark physicochemical region types, for a number of different types of said intra-authentication mark physicochemical regions identified in, or assigned to, said hyper-spectrally imaged authentication mark.

14. The method of claim 13, wherein each said intra-authentication mark physicochemical region type is associated with a different set of physicochemical properties and characteristics data of said hyper-spectrally imaged authentication mark.

15. The method of claim 1, wherein step (d), a said sub-set of intra-authentication mark spectral fingerprint pattern data is included in said intra-authentication mark physicochemical region group, for correlating line or edge effects present in said hyper-spectrally imaged authentication mark detected during said hyper-spectral imaging of the authentication mark.

16. The method of claim 1, wherein step (e) is performed according to an established authentication criterion or specification based on having a pre-determined minimum number of matched values of said data elements during and/or following said comparing of said sets of intra-authentication mark physicochemical properties and characteristics data.

17. The method of claim 1, used for determining non-authenticity of a non-authentic article having a non-authentic authentication mark, wherein following performing steps (a)-(d) for said non-authentic article, the method further comprises comparing and mismatching values of elements in said set of intra-authentication mark physicochemical properties and characteristics data relating to said hyper-spectrally imaged non-authentication mark, to said values of corresponding reference elements in said reference set of intra-authentication mark physicochemical properties and characteristics data of the authentic article, thereby determining said non-authenticity of said non-authentic article.

18. The method of claim 1, wherein the authentic article is selected from the group consisting of a printed paper form of a monetary currency, a bank note, a check, a company or stock certificate; a printed plastic (laminated) card form of a monetary currency; and a printed paper or plastic (laminated) card form of an identification or other legal document.

19. The method of claim 1, wherein the authentic article is composed of, or includes, a micron sized non-metallic or metallic fiber, thread, or ribbon, or, a micron sized printed integrated electronic circuit or chip.

20. The method of claim 1, wherein the authentic article is composed of, or includes, protein or nucleic acid (DNA) molecules or molecular fragments.

21. The method of claim 1, wherein the authentic article is composed of, or includes, a non-living or living microorganism.

22. The method of claim 1, wherein the authentic article is composed of, or includes, an essentially flat and smooth two-dimensional pattern or design, or, an elevated or contoured and rough, three-dimensional pattern or design.

23. The method of claim 1, wherein the authentic article is composed of, or includes, a plurality or composite (physical overlay) of two or more single essentially flat and smooth two-dimensional patterns or designs, or, a plurality or composite (physical overlay) of two or more single elevated or contoured and rough, three-dimensional patterns or designs.

* * * * *